United States Patent
Zhang et al.

(10) Patent No.: US 10,816,569 B2
(45) Date of Patent: Oct. 27, 2020

(54) Z AXIS ACCELEROMETER USING VARIABLE VERTICAL GAPS

(71) Applicant: Analog Devices, Inc., Norwood, MA (US)

(72) Inventors: Xin Zhang, Acton, MA (US); Gaurav Vohra, Sudbury, MA (US)

(73) Assignee: Analog Devices, Inc., Norwood, MA (US)

( * ) Notice: Subject to any disclaimer, the term of this patent is extended or adjusted under 35 U.S.C. 154(b) by 179 days.

(21) Appl. No.: 16/125,604

(22) Filed: Sep. 7, 2018

(65) Prior Publication Data

US 2020/0081028 A1   Mar. 12, 2020

(51) Int. Cl.
G01P 15/125 (2006.01)
G01P 15/08 (2006.01)

(52) U.S. Cl.
CPC .... *G01P 15/125* (2013.01); *G01P 2015/0831* (2013.01)

(58) Field of Classification Search
CPC ................... G01P 15/125; G01P 2015/0831
See application file for complete search history.

(56) References Cited

U.S. PATENT DOCUMENTS

| | | | |
|---|---|---|---|
| 4,002,077 A | 1/1977 | Taplin | |
| 4,454,756 A | 6/1984 | Sharp et al. | |
| 5,488,864 A | 2/1996 | Stephan | |
| 6,038,924 A | 3/2000 | Lee et al. | |
| 6,230,566 B1 | 5/2001 | Lee et al. | |
| 6,845,670 B1 | 1/2005 | McNeil et al. | |
| 7,121,141 B2 | 10/2006 | McNeil | |
| 7,140,250 B2 | 11/2006 | Leonardson et al. | |

(Continued)

FOREIGN PATENT DOCUMENTS

| | | |
|---|---|---|
| EP | 1 257 783 A1 | 11/2002 |
| EP | 1 717 669 A1 | 11/2006 |

(Continued)

OTHER PUBLICATIONS

International Search Report and Written Opinion dated Dec. 8, 2019 in connection with International Application No. PCT/US2019/049624.

(Continued)

*Primary Examiner* — David Z Huang
(74) *Attorney, Agent, or Firm* — Wolf, Greenfield & Sacks, P.C.

(57) ABSTRACT

Z-axis microelectromechanical systems (MEMS) accelerometers are described. The z-axis MEMS accelerometers are of a teeter-totter type, having a pivoting beam suspended above a substrate. A non-uniform gap distance between the pivoting beam and the substrate is provided to increase the sensitivity of the accelerometer to z-axis acceleration. In some embodiments, the non-uniform gap distance is created by one or more substrate layers, such as one or more layers of polysilicon on the substrate above which the pivoting beam is suspended. In some embodiments, the non-uniform gap distance is created by the use of one or more bumps on the beam. In some embodiments, both substrate layers and bumps are used to provide a non-uniform gap distance for different electrodes of the accelerometer. The non-uniform gap distance may include a gap of reduced height, resulting in increased sensitivity of the accelerometer to z-axis accelerations.

20 Claims, 6 Drawing Sheets

(56) References Cited

U.S. PATENT DOCUMENTS

| | | |
|---|---|---|
| 7,210,352 B2 | 5/2007 | Foster et al. |
| 8,304,274 B2 | 11/2012 | Zuniga-Ortiz et al. |
| 8,539,836 B2 | 9/2013 | McNeil |
| 8,555,719 B2 | 10/2013 | McNeil et al. |
| 8,671,756 B2 | 3/2014 | Comi et al. |
| 8,689,632 B2 | 4/2014 | Jia et al. |
| 8,978,475 B2 | 3/2015 | Acar |
| 9,218,065 B2 | 12/2015 | Mahameed et al. |
| 9,297,825 B2 | 3/2016 | Zhang et al. |
| 9,360,496 B2 | 6/2016 | Naumann |
| 9,377,482 B2 | 6/2016 | Comi et al. |
| 9,389,077 B2 | 7/2016 | Comi et al. |
| 9,470,709 B2 | 10/2016 | Zhang |
| 2002/0092352 A1 | 7/2002 | Foote |
| 2003/0036214 A1 | 2/2003 | Eskridge |
| 2007/0034007 A1 | 2/2007 | Acar |
| 2007/0090475 A1 | 4/2007 | Karnick et al. |
| 2011/0313703 A1 | 12/2011 | Petillon et al. |
| 2012/0125104 A1 | 5/2012 | Qiu et al. |
| 2012/0204642 A1 | 8/2012 | McNeil et al. |
| 2013/0214367 A1 | 8/2013 | Van der Heide et al. |
| 2013/0333471 A1 | 12/2013 | Chien |
| 2014/0217929 A1 | 8/2014 | Lin et al. |
| 2015/0177272 A1 | 6/2015 | Clark |
| 2015/0268268 A1 | 9/2015 | Liu et al. |
| 2015/0309069 A1 | 10/2015 | Boillot et al. |
| 2016/0097791 A1 | 4/2016 | Zhang |
| 2016/0130133 A1 | 5/2016 | Boillot et al. |
| 2016/0377648 A1 | 12/2016 | Zhang |
| 2017/0023606 A1 | 1/2017 | Naumann |
| 2017/0108529 A1 | 4/2017 | Zhang et al. |
| 2017/0328931 A1 | 11/2017 | Zhang et al. |

FOREIGN PATENT DOCUMENTS

| | | |
|---|---|---|
| JP | 2013-527920 A | 7/2013 |
| JP | 2014-029325 A | 2/2014 |
| TW | I488432 B | 6/2015 |
| TW | I570054 B | 2/2017 |
| WO | WO 01/051890 A1 | 7/2001 |
| WO | WO 2010/019278 A1 | 2/2010 |
| WO | WO 2011/124576 A1 | 10/2011 |
| WO | WO 2011/148137 A1 | 12/2011 |
| WO | WO 2013/030798 A1 | 3/2013 |
| WO | WO 2016/108770 A1 | 7/2016 |
| WO | WO 2017/070015 A1 | 4/2017 |

OTHER PUBLICATIONS

International Search Report and Written Opinion dated Dec. 31, 2019 in connection with International Application No. PCT/US2019/050587.

Shi et al., Asymmetric Seesaw Structure of Microelectromechanical Systems Accelerometer for Sensing Out-off-Plane Acceleration. ScienceDirect. Nov. 1, 2017;267:01-22.

Amini_et_al_Micro-Gravity Capacitive Silicon-On-Insulator Accelerometers. J. Micromech. Microeng. Georgia Institute of Technology. Sep. 23, 2005; 15:2113-2120.

U.S. Appl. No. 16/129,755, filed Sep. 12, 2018, Zhang et al.

US 10,816,569 B2

Z AXIS ACCELEROMETER USING VARIABLE VERTICAL GAPS

FIELD OF THE DISCLOSURE

The present application relates to z-axis microelectromechanical systems (MEMS) accelerometers.

BACKGROUND

Z-axis MEMS accelerometers are linear accelerometers which sense acceleration along the z-axis. Some such accelerometers have a teeter-totter construction, with a plate or beam that pivots about a central anchor in response to acceleration of the device in the z-direction.

SUMMARY OF THE DISCLOSURE

Z-axis microelectromechanical systems (MEMS) accelerometers are described. The z-axis MEMS accelerometers are of a teeter-totter type, having a pivoting beam suspended above a substrate. A non-uniform gap distance between the pivoting beam and the substrate is provided to increase the sensitivity of the accelerometer to z-axis acceleration. In some embodiments, the non-uniform gap distance is created by one or more substrate layers, such as one or more layers of polysilicon on the substrate above which the pivoting beam is suspended. In some embodiments, the non-uniform gap distance is created by the use of one or more bumps on the beam. In some embodiments, both substrate layers and bumps are used to provide a non-uniform gap distance for different electrodes of the accelerometer. The non-uniform gap distance may include a gap of reduced height, resulting in increased sensitivity of the accelerometer to z-axis accelerations.

According to an aspect of the present application, a z-axis microelectromechanical systems (MEMS) accelerometer having non-uniform electrode distances is provided. The z-axis MEMS accelerometer comprises a substrate, a pivotable beam coupled to the substrate by an anchor and configured to pivot about the anchor, a conductive layer disposed on the substrate, and a substantially continuous signal electrode disposed on the substrate above the conductive layer and separated from the pivotable beam by a first gap having a first distance. A reference electrode may be disposed on the substrate, and separated from the pivotable beam by a second gap having a second distance greater than the first distance.

According to an aspect of the present application, a z-axis microelectromechanical systems (MEMS) accelerometer having multiple electrode distances is provided, comprising a silicon substrate having an upper surface, a pivotable beam suspended above the upper surface of the silicon substrate, a reference electrode positioned a first distance from the upper surface of the silicon substrate and separated from the pivotable beam by a first gap having a first gap distance, and a substantially continuous signal electrode positioned a second distance greater than the first distance from the upper surface of the silicon substrate and separated from the pivotable beam by a second gap having a second gap distance less than the first gap distance.

According to an aspect of the present application, a z-axis microelectromechanical systems (MEMS) accelerometer having multiple electrode distances is provided, comprising a silicon substrate having an upper surface, a pivotable beam suspended above the upper surface of the silicon substrate, and means for detecting motion of the pivotable beam.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1A:
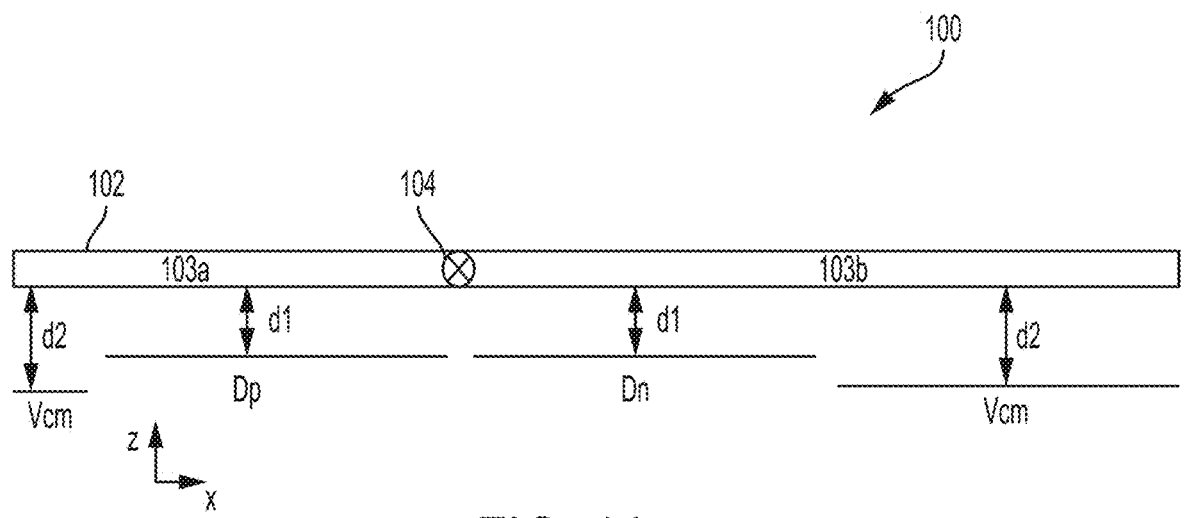
FIG. 1A is a cross-sectional schematic view of a z-axis accelerometer having signal and reference electrodes at different distances from the accelerometer beam and in a state of zero acceleration, according to a non-limiting embodiment of the present application.

Microelectromechanical systems (MEMS) teeter-totter z-axis accelerometers having small and/or non-uniform (or variable) gap distances between the movable beam (or plate) and the underling substrate are described. The sensitivity of a MEMS teeter-totter z-axis accelerometer may depend on the distance between the upper surface of the substrate and the ends of the pivoting beam suspended above the substrate. The greater the distance, the lower the sensitivity. Conversely, smaller gap distances may produce higher sensitivity. Moreover, higher frequencies of operation typically correlate to lower device sensitivity, since sensitivity and frequency are inversely proportional for MEMS teeter-totter z-axis accelerometers. Thus, the use of small gap distances between the beam and the upper surface of the substrate—and driving and/or sensing electrodes (sometimes referred to herein as "signal electrodes") on the upper surface of the substrate—may be particularly useful to facilitate high frequency operation of the MEMS teeter-totter z-axis accelerometer by providing increased sensitivity. Moreover, the use of different (or non-uniform) gap distances between the pivoting beam and the substrate may facilitate higher sensitivity operation, and therefore be particularly useful at high frequencies of operation. The different gap distances may be created using different structures of different heights (or elevations) on the substrate. According to some aspects of the technology, higher frequency operation with higher sensitivity may be achieved using techniques described herein.

According to an aspect of the present application, a z-axis MEMS accelerometer comprises non-uniform (or variable) electrode distances with respect to the teeter-totter beam of the accelerometer. The z-axis MEMS accelerometer in some embodiments includes both signal and reference electrodes disposed on the substrate beneath the beam, with the signal electrode(s) being substantially continuous. The signal electrode(s) may be used to drive and/or sense movement of the beam, such as pivoting of the beam about a pivot point. The reference electrode(s) may be used to confine the area of charge in the beam corresponding to a particular signal electrode. The mass of the beam may be imbalanced with respect to its axis of rotation, for example by having one side of the beam longer than the other side of the beam separated by the rotation axis of the beam. The reference electrodes facilitate maintaining the area of charge buildup on both sides of the beam separated by the rotation axis relatively equal. The beam may overlie both signal electrodes and reference electrodes, with the distance between the beam and the signal electrodes being different, and in at least some cases smaller, than the distance between the beam and the reference electrodes. The differing gap distances may facilitate high frequency operation while avoiding undesirable device behavior such as the beam hitting and/or sticking to the underlying substrate.

The aspects and embodiments described above, as well as additional aspects and embodiments, are described further below. These aspects and/or embodiments may be used individually, all together, or in any combination of two or more, as the application is not limited in this respect.

Figure 1B:
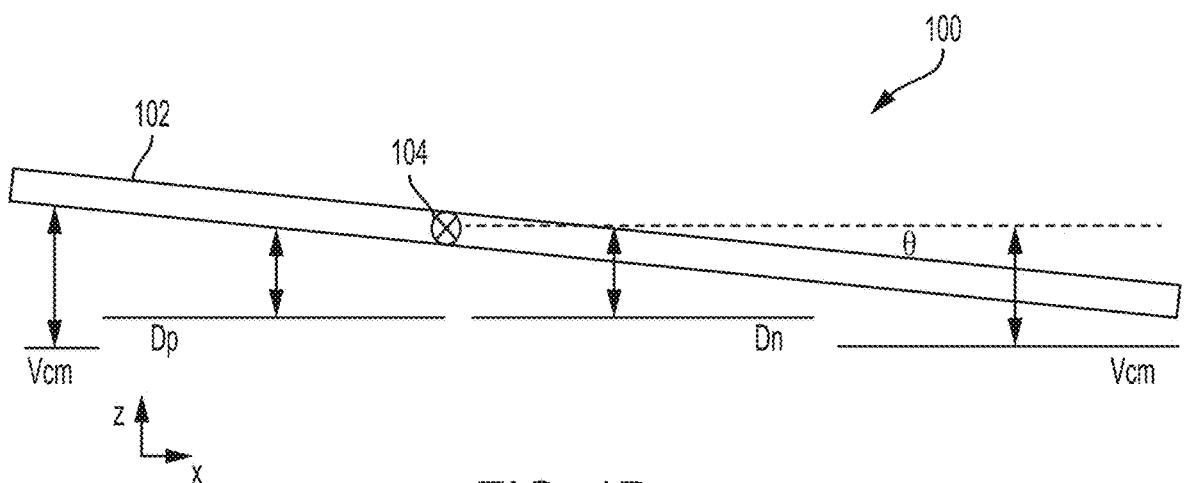
FIG. 1B is a cross-sectional schematic view of the z-axis accelerometer of FIG. 1A in a state of non-zero acceleration, according to a non-limiting embodiment of the present application.

According to an aspect of the present application, a z-axis MEMS accelerometer comprises a reference electrode and substantially continuous signal electrode placed at different distances from the pivotable beam of the accelerometer. FIGS. 1A and 1B illustrate cross-sectional schematic diagrams of a non-limiting example of such a z-axis MEMS accelerometer. The z-axis MEMS accelerometer 100 comprises a pivotable beam (or plate) 102 configured to pivot about a pivot point 104, positive signal electrode Dp, negative signal electrode Dn, and reference signal electrodes Vcm. The signal and reference electrodes may be disposed on a substrate underlying the pivotable beam 102, as shown in subsequent figures. Optionally, an anchor may be coupled to the pivotable beam 102 at the pivot point 104, as shown in subsequent figures, although alternative manners of connecting the pivotable beam 102 to a support or substrate are possible.

The pivotable beam 102, which may also be referred to as a plate, proof mass, teeter-totter, or by other similar terminology, may be any suitable pivotable beam, as the application is not limited in this respect. The pivotable beam 102 may be formed of any suitable material, such as a semiconductor. In some embodiments, the pivotable beam 102 is formed of doped silicon, with a doping level sufficient to make the beam conductive. In this manner, the pivotable beam may form capacitances with the electrodes Dp, Dn, and Vcm. Alternative constructions may include forming distinct electrodes on the pivotable beam 102 rather than doping the beam. The pivotable beam is asymmetric about the pivot point 104 in at least some embodiments, to facilitate rotation in response to acceleration in the z-direction. For example, the portion 103a of the pivotable beam 102 on the left side of the pivot point 104 may have less mass than the portion 103b on the right side of the pivot point 104. In some embodiments, the portion 103a may be shorter in the x-direction than the portion 103b.

The positive and negative signal electrodes, Dp and Dn, may be formed on a substrate underlying the pivotable beam 102. They may be more generally referred to as first and second electrodes. Employing two signal electrodes as shown may allow for differential operation of the z-axis MEMS accelerometer 100. The signal electrodes Dp and Dn may be substantially continuous as shown. The signal electrodes may lack breaks, openings, holes, or other voids within the perimeter of the electrodes. The signal electrodes Dp and Dn may be formed of various materials. In some embodiments, they are formed of polysilicon.

The reference electrodes, which may also be referred to as common electrodes or by other similar terminology, serve to confine charge in the pivotable beam to areas overlying the signal electrodes Dp and Dn. The reference electrodes Vcm are at the same electrical potential as the pivotable beam, and thus confine fringing electric fields from the signal electrodes Dp and Dn. In this manner, the area of charge in the pivotable beam 102 may be the same above the signal electrode Dp as above the signal electrode Dn despite the portions 103a and 103b being of different sizes in some embodiments. The reference electrodes Vcm may be electrically connected to the beam in any suitable manner, such as by a conductive trace between the reference electrodes and an anchor supporting the beam. Other manners of connection are also possible.

As shown in FIG. 1A, the gaps between the pivotable beam 102 and the signal electrodes Dp and Dn and reference electrodes Vcm may be different, or non-uniform. Specifically, Dp and Dn are separated from the pivotable beam 102 by smaller gaps, with gap distance d1, than are the reference electrodes Vcm, which are separated by a distance d2 in FIG. 1A. These different gap distances may be achieved in different manners, as described further below in detail in connection with FIGS. 2A and 3A. In one implementation, the signal electrodes Dp and Dn may be elevated relative to the reference electrodes Vcm by being positioned on one or more additional substrate layers which do not underlie the reference electrodes Vcm. In another implementation, the pivotable beam 102 may include a non-planar surface contour, such as surface bumps, overlying and facing the signal electrodes but not overlying the reference electrodes. In another implementation, both elevated signal electrodes and a non-planar beam surface contour are used in combination to provide a shorter gap distance from the pivotable beam 102 to the signal electrodes Dp and Dn than from the pivotable beam to the reference electrodes Vcm.

FIG. 1A illustrates a state of operation of the z-axis MEMS accelerometer 100 in which no acceleration is experienced in the z-direction. This may alternatively be referred to as a zero g state or equilibrium state. In this state, as shown, the reference electrodes Vcm may be separated from the pivotable beam by the same distance as each other, shown as d2, and the signal electrodes Dp and Dn may be separated from the pivotable beam 102 by the same distance as each other, shown as d1.

FIG. 1B illustrates a state of operation of the z-axis MEMS accelerometer 100 in which z-axis acceleration is experienced, causing portion 103a of the pivotable beam 102 to move away from the signal electrode Dp and portion 103b of the pivotable beam 102 to move toward the signal electrode Dn. The pivotable beam 102 is tilted at an angle θ relative to its equilibrium position. As a result of the signal electrodes Dp and Dn being at smaller distances d1 from the pivotable beam than the distance d2, the accelerometer is more sensitive than if the signal electrodes Dp and Dn were placed at the larger distance d2 from the pivotable beam 102. This increased sensitivity may be beneficial in various applications, such as high frequency applications. At high frequencies, for example greater than 10 kHz (e.g., between 10 kHz and 60 kHz, between 15 kHz and 40 kHz, or any values within those ranges), the motion of the pivotable beam 102 may be relatively small, for example on the order of a few nanometers (e.g., less than 10 nm, less than 5 nm, or less than 1 nm), so that using small gap distance d1 may provide meaningful sensitivity improvement. By contrast, using small gap distance d1 for low frequency applications may be undesirable, as such a configuration may be more prone to stiction. According to a non-limiting example, d1 may be between 1 micron and 1.5 microns, and d2 may be between 1.7 microns and 2.5 microns. Alternative dimensions are possible.

The use of variable gap distances as shown in FIG. 1 may provide for high sensitivity operation while also reducing the risk of stiction or overload problems. As described above, using smaller gap distances d1 for the signal electrodes provides higher sensitivity operation. However, placing the reference electrodes Vcm at the same reduced distance d1 from the pivotable beam 102 may increase the chance of stiction and/or damage in overload situations because of the increased chance of the ends of the pivotable beam 102 contacting the reference electrodes. Thus, placing the reference electrodes Vcm at a greater distance from the pivotable beam 102 may reduce the chance of the beam contacting the reference electrodes and thus reduce the chance of stiction and damage from the pivotable beam. Accordingly, employing variable gap distances for the signal electrodes and reference electrodes as shown in FIG. 1A may provide beneficial operation.

In the non-limiting embodiment of FIGS. 1A and 1B, the signal electrodes Dp and Dn may be positioned at substantially equal distances from the pivotable beam 102 in an equilibrium state, as shown in FIG. 1A. However, alternatives are possible. In some embodiments, the signal electrodes Dp and Dn may be positioned at different distances from the pivotable beam 102, even in an equilibrium state. For example, the signal electrode Dp may be positioned at a greater equilibrium distance from the pivotable beam than is the signal electrode Dn, or vice versa.

Figure 2A:
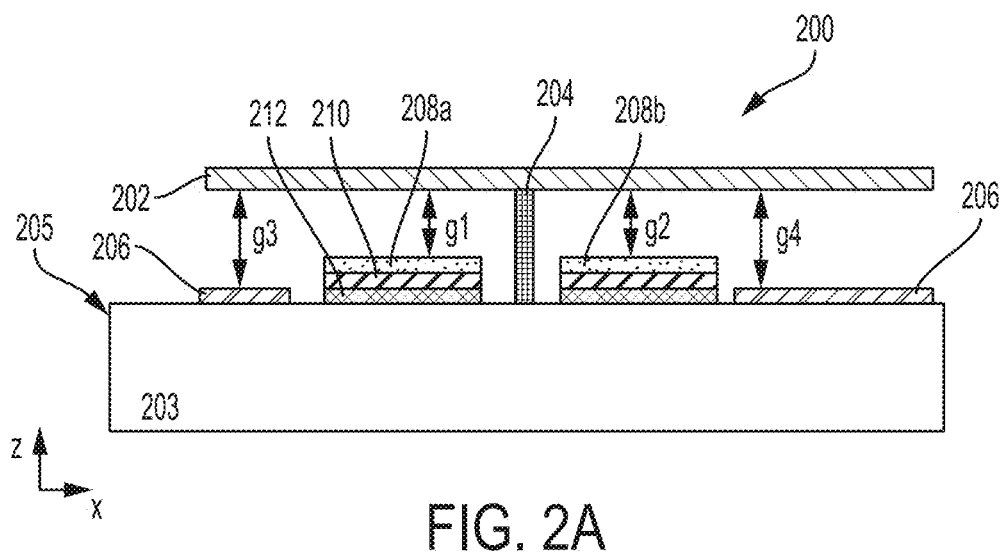
FIG. 2A is a cross-section of a z-axis MEMS accelerometer having signal and reference electrodes at different distances from the accelerometer beam, according to a non-limiting embodiment of the present application.

As described above, there are multiple manners for implementing a z-axis MEMS accelerometer having non-uniform gap distances between signal and reference electrodes. According to some embodiments, a z-axis MEMS accelerometer has elevated signal electrodes. FIG. 2A illustrates an example in cross-sectional form. The z-axis MEMS accelerometer 200 comprises a pivotable beam 202, substrate 203, anchor 204, reference electrodes 206, first signal electrode 208a and second signal electrode 208b. The first signal electrode 208a and second signal electrode 208b are disposed on layers 210 and 212.

The pivotable beam 202 may be any suitable pivotable beam. For example, the pivotable beam 202 may be any of the types described in connection with pivotable beam 102, or any other suitable pivotable beam.

Figure 2B:
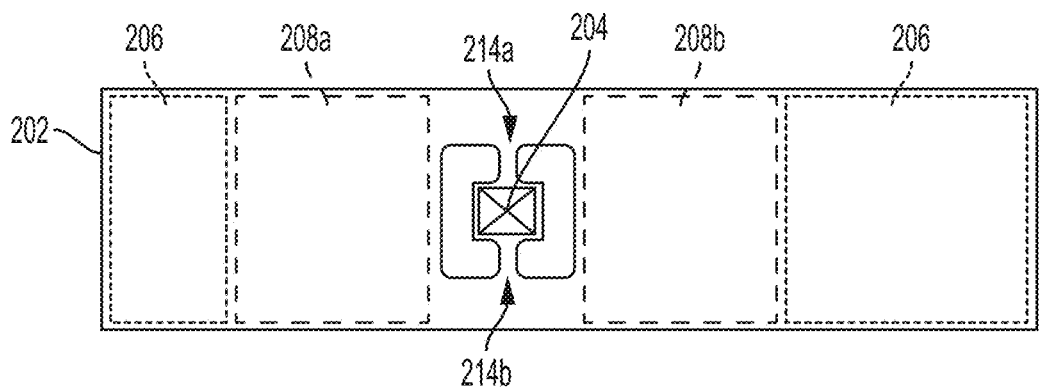
FIG. 2B is a top view of certain components of the z-axis MEMS accelerometer of FIG. 2A.

The anchor 204 may be disposed on the upper surface 205 of the substrate 203, which may be any suitable substrate, such as a semiconductor substrate. In some embodiments, the substrate 203 is a silicon substrate. The anchor 204 may be coupled to the pivotable beam 202 such that the pivotable beam 202 is suspended above the substrate 203 and may pivot about the anchor 204. FIG. 2B illustrates a top planar view of certain identified components of the z-axis MEMS accelerometer of FIG. 2A. As shown, the anchor 204 may couple to the pivotable beam 202 by tethers, or torsional springs, 214a and 214b. The tethers 214a and 214b may be any suitable couplers for allowing the pivotable beam 202 to rotate in response to z-direction acceleration.

Referring again to FIG. 2A, the reference electrodes 206 are disposed on the upper surface 205 of the substrate 203. The reference electrodes 206 may be formed of any suitable conductive material. In some embodiments, the reference electrodes 206 are formed of doped polysilicon, which may be a first polysilicon layer of the z-axis MEMS accelerometer 200.

As shown, the signal electrodes 208a and 208b are elevated from the upper surface 205 of the substrate 203 by layers 210 and 212. The signal electrodes 208a and 208b may be differentially connected signal electrodes, such as described previously in connection with positive and negative signal electrodes Dp and Dn in FIG. 1A. The layers 210 and 212 may be any suitable layers for elevating the signal electrodes 208a and 208b. In some embodiments, the layer 210 is an insulating layer (e.g., a dielectric) such as silicon oxide or a nitride, and the layer 212 is a conductive layer. In some embodiments, the layer 212 is the same material as the reference electrodes 206. For example, the reference electrodes 206 and layer 212 may be different parts of the same polysilicon layer. Alternative configurations are possible, however. It should be appreciated that the layers 210 and 212 may be employed as a standoff for the signal electrodes 208a and 208b despite that they may store charge and contribute undesirably to a parasitic capacitance.

Because the signal electrodes 208a and 208b are elevated compared to the reference electrodes 206, the signal electrodes 208a and 208b are separated from the pivotable beam 202 by smaller gaps g1 and g2, respectively, than the reference electrodes, which are separated by gaps g3 and g4, as shown. As described above in connection with FIGS. 1A and 1B, the use of smaller gap distances for the gaps between the signal electrodes and the pivotable beam may provide increased acceleration sensitivity, particularly at high frequencies of operation. Also, the signal electrodes are closer to the anchor 204 than are the reference electrodes 206.

The particular configuration of the signal electrodes 208a, 208b and reference electrodes 206 shown in FIG. 2A is not limiting, as various alternatives are possible. In some embodiments, the reference electrodes 206 may not directly contact the upper surface 205 of the substrate 203. For example, the reference electrodes 206 may themselves be separated from the upper surface 205 by one or more layers, but the signal electrodes 208a and 208b may be separated from the upper surface 205 by a greater distance, for example being separated by a greater number of layers and/or layers of greater thickness in the z-direction. In one non-limiting example, the layer 212 is a polysilicon layer, layer 210 is an insulator, and signal electrodes 208a and 208b represent portions of a second polysilicon layer. However, alternatives are possible.

In at least some embodiments, the signal electrodes 208a and 208b may be substantially continuous (where "substantially continuous" includes entirely continuous). Referring to the top planar view of FIG. 2B, the signal electrodes 208a and 208b do not have any breaks, holes, or voids. Rather, they may represent substantially continuous portions of a conductive layer. In at least some embodiments, the signal electrodes have continuous perimeters, with no breaks. In some embodiments, one or more of the signal electrodes lack any complete breaks or holes occupying more than 10% of the signal electrode area. Moreover, in at least some embodiments, such as shown in FIG. 2A, the signal electrodes 208a and/or 208b are separated from the substrate 203 by solid layers 210 and 212, meaning there are no voids, cavities, or openings in the z-direction between the signal electrodes 208a, 208b and the substrate 203. In some embodiments, the signal electrodes 208a and 208b are substantially continuous and separated from the substrate 203 by solid layers without gaps, holes, or other voids.

Figure 2C:
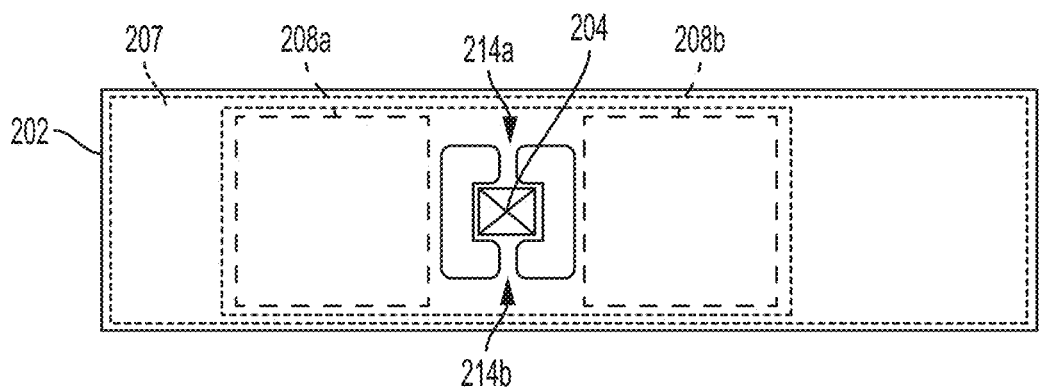
FIG. 2C is an alternative to FIG. 2B, in which the reference electrode forms a closed contour.

In FIG. 2B, the reference electrodes 206 and signals electrodes 208a and 208b are shown in dashed lines since they lie under the pivotable beam 202 in this view. The reference electrodes 206 may underlie an outer region or a periphery of the pivotable beam 202 and the substantially continuous signal electrodes 208a and 208b underlie an inner or central region of the pivotable beam. In some embodiments, the reference electrodes 206 may wrap around the signal electrodes 208a and 208b with respect to a top view like that shown in FIG. 2B. In an alternative embodiment, a single reference electrode may be provided, with the signal electrodes 208a and 208b disposed within a central opening of the reference electrode with respect to a top view. For example, referring to FIG. 2B, the two illustrated reference electrodes 206 may instead be a single reference electrode with a closed contour wrapping around the signal electrodes 208a and 208b with respect to the top view. FIG. 2C illustrates a non-limiting example, in which the two reference electrodes 206 are replaced with a single reference electrode 207 forming a closed contour—a ring— inside of which are disposed the signal electrodes 208a and 208b, with respect to the illustrated top down view.

It should be appreciated from FIG. 2A that according to an aspect of the application a teeter-totter MEMS accelerometer includes a pivoting plate overlying signal electrodes and common electrodes (also referred to as reference electrodes), and the signal electrodes are disposed over a standoff on a substrate. The standoff may be a single layer or multi-layer structure, such as the combination of layers 210 and 212. The standoff may include conductive layers, insulating layers, or a combination thereof. The standoff may have any suitable thickness (in the z-direction) to reduce the gap between the plate and the signal electrodes to a desired distance.

Variations on the construction shown in FIG. 2A are possible. According to an alternative embodiment, the signal electrodes 208a and 208b may not be elevated relative to the upper surface 205 of the substrate 203, but rather the reference electrodes 206 may be recessed in the substrate 203. For example, recesses may be etched in the substrate 203 and then reference electrodes formed in the recesses. The signal electrodes may be formed on the upper surface 205 or on one or more layers disposed on the upper surface 205. By placing the reference electrodes 206 in recesses in the substrate 203, non-uniform gap distances between the pivotable beam 202 and the reference and signal electrodes may be attained.

Figure 3A:
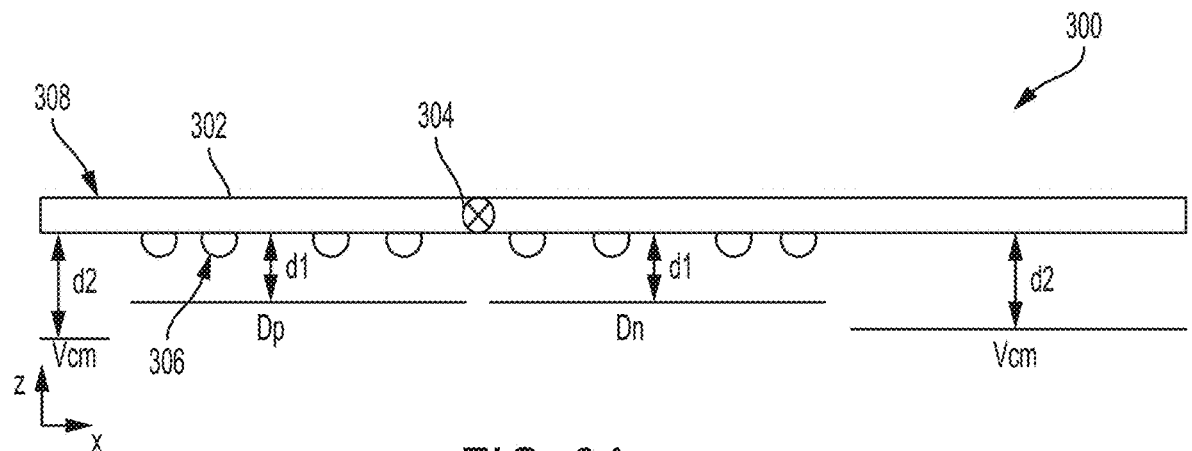
FIG. 3A is a cross-sectional schematic view of a z-axis MEMS accelerometer having non-uniform electrode distances and bumps on an underside of the accelerometer beam, according to a non-limiting embodiment of the present application.

According to an aspect of the present application, a z-axis MEMS accelerometer comprises a pivotable beam with underside contouring configured to reduce a gap between the pivotable beam and signal electrodes on an underlying substrate. FIG. 3A illustrates a non-limiting example. The z-axis MEMS accelerometer 300 comprises a pivotable beam 302 configured to pivot about a pivot point 304. The reference electrodes Vcm and positive and negative signal electrodes Dp and Dn, all previously described, are separated from the pivotable beam 302 by the indicated distances d1 and d2 in the equilibrium state of FIG. 3A.

The pivotable beam 302 may include a non-planar surface contour which causes it to have a smaller gap with respect to the signal electrodes than with respect to the reference electrodes. In the example illustrated, the pivotable beam 302 includes underside bumps 306. The underside bumps are on the surface of the pivotable beam 302 facing the signal electrodes. In the example shown, the bumps 306 are not on the upper surface 308 of the pivotable beam 302 since positioning them there would not reduce the gap distance between the pivotable beam 302 and the signal electrodes. Thus, as shown, in some embodiments the upper surface 308 of the pivotable beam 302 may be substantially planar, and only the underside of the pivotable beam 302 may have a contour resulting in a reduced gap to the signal electrodes.

The surface bumps 306 may have any suitable shape. In some embodiments, they may be hemispherical. In some embodiments, they may be pillars. In some embodiments, they may be substantially rectangular. The particular shape is not limiting.

The underside bumps 306 may represent extensions of the pivotable beam 302. Alternatively, the underside bumps 306 may be formed of a separate material coupled to (e.g., bonded to) the underside of the pivotable beam 302. Other variations are possible.

The underside bumps 306 may be provided in any suitable number, size and density. In some embodiments, the underside bumps may cover greater than 30% of the area of the pivotable beam overlying the signal electrodes Dp and Dn. In some embodiments, the underside bumps may cover between 30% and 70% of the area of the pivotable beam overlying the signal electrodes. Some z-axis MEMS accelerometers include anti-stiction bumps to prevent stiction of the beam to the substrate. Such anti-stiction bumps are typically included at a low density, and have a relatively small size. Such anti-stiction bumps conventionally do not practically reduce the gap size between the beam and signal electrodes. By contrast, the underside bumps 306 may be provided at a sufficient size and density to create a reduction in the gap distance between the pivotable beam and the signal electrodes. For example the underside bumps 306 may have a height (in the z-direction) of between 0.10 and 0.25 microns, and a diameter (in the plane of the underside of the pivotable beam 302) of between 20 and 40 microns in some non-limiting embodiments. In some embodiments, the pivotable beam may include both anti-stiction bumps and underside bumps sized and positioned to reduce the gap between the pivotable beam and the underlying substrate, as described. The anti-stiction bumps and the underside bumps configured to reduce the gap may differ in size, location and/or density.

Figure 3B:
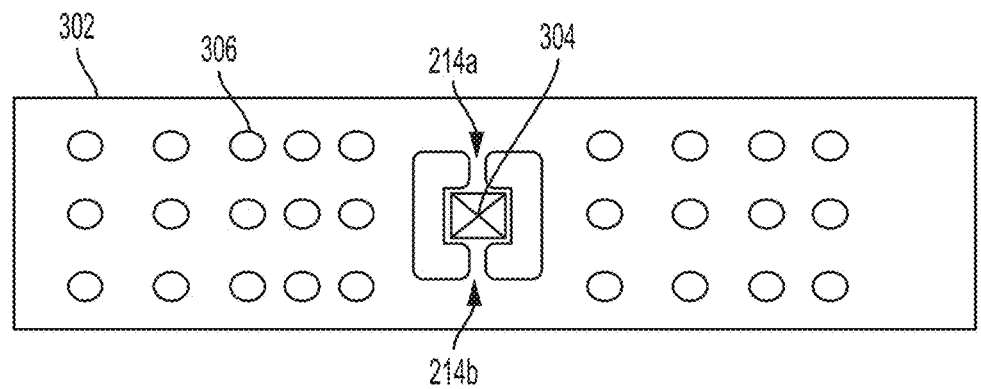
FIG. 3B illustrates a bottom view of a portion of the z-axis MEMS accelerometer of FIG. 3A.

FIG. 3B illustrates a bottom view of the pivotable beam 302. As shown, the undersigned bumps 306 may be formed on a portion of the pivotable beam, but not over the entirety of the underside of the pivotable beam. The illustrated arrangement of the underside bumps 306 is non-limiting, as they may be placed in any suitable manner to provide a reduction in the gap distance between the pivotable beam and the signal electrodes Dp and Dn.

Figure 4:
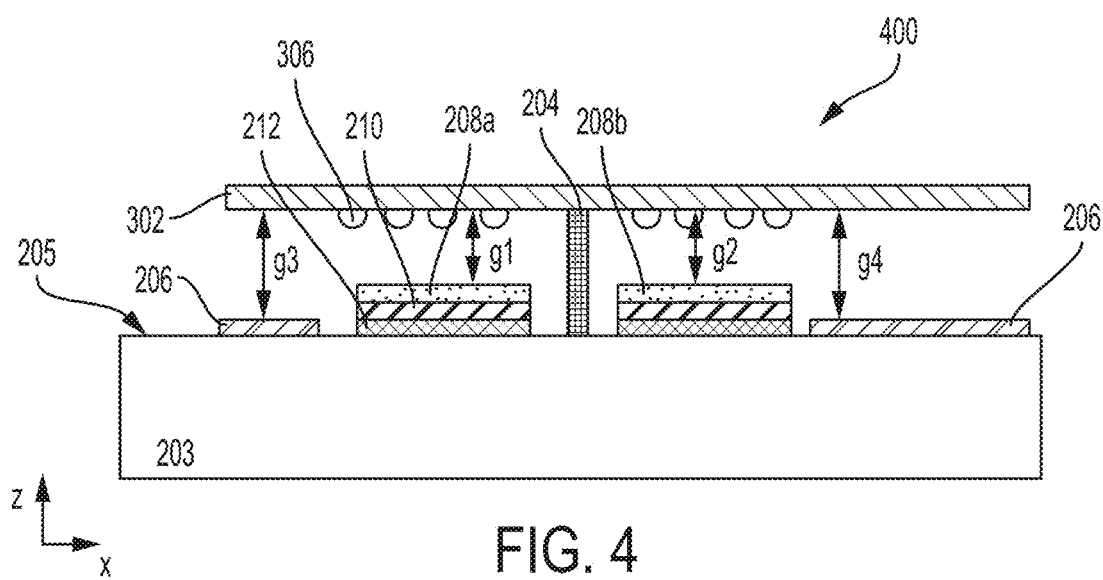
FIG. 4 is a cross-section of a z-axis MEMS accelerometer having signal and reference electrodes at different distances form the accelerometer beam, and including both elevated signal electrodes and a non-planar underside contour of the beam, according to a non-limiting embodiment of the present application.

According to an aspect of the present application, a z-axis MEMS accelerometer has a reduced gap distance between a pivoting beam and underlying signal electrodes both because of surface contouring of the pivoting beam as well as the signal electrodes being elevated. FIG. 4 illustrates a non-limiting example. The z-axis MEMS accelerometer 400 comprises various components previously described, and includes both elevated signal electrodes 208a and 208b and underside bumps 306. In this manner, a greater reduction in the distances of gaps g1 and g2 may be provided than by using just one or the other of the underside bumps 306 and elevated signal electrodes.

According to an aspect of the present application, MEMS z-axis teeter-totter accelerometers of the types described herein may be operated in a self-test mode, in which the pivotable beam is driven to move by the signal electrode(s) and the ensuing motion is detected. The non-uniform gap distances of the accelerometers described herein may provide greater output signal for a given drive signal in self-test mode. Thus, accelerometers described herein may provide beneficial self-test operation.

Figure 5:
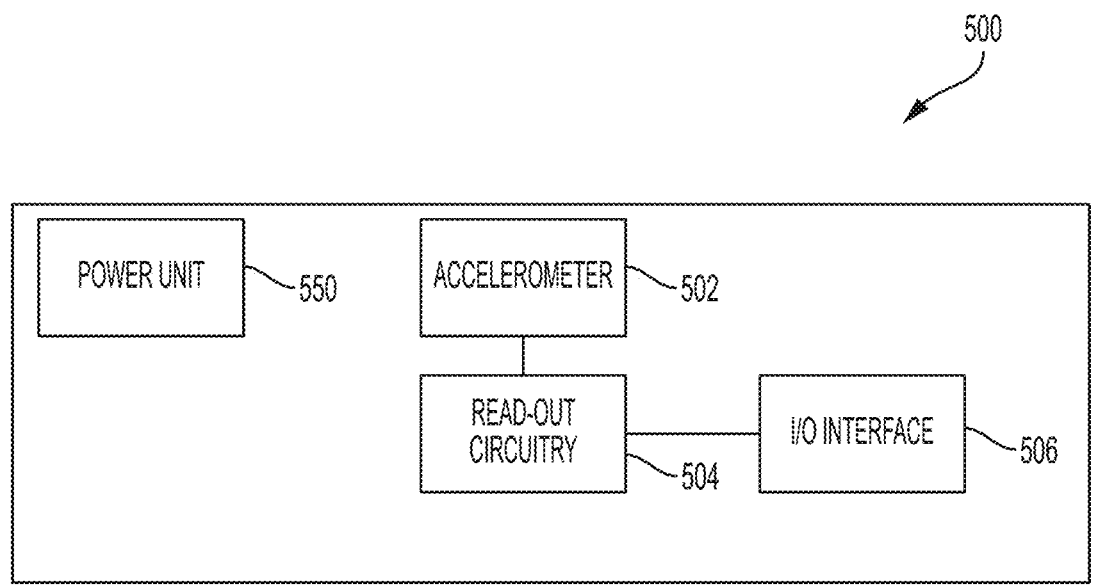
FIG. 5 illustrates a system employing a z-axis accelerometer of the types described herein, according to a non-limiting embodiment of the present application.

FIG. 5 illustrates a system employing a z-axis accelerometer of the types described herein, according to a non-limiting embodiment of the present application. The system 500 includes a accelerometer 502, read-out circuitry 504, input/output (I/O) interface 506 and power unit 550. Accelerometer 502 may be any of the types described herein.

The read-out circuitry 504 may be configured to provide signals proportional to the linear z-direction acceleration sensed by accelerometer 502. For example, the read-out circuitry 504 may be connected to metal pads on the substrate of the z-axis MEMS accelerometer (e.g., substrate 203) to generate signals proportional to the sensed capacitances. In some embodiments the signal(s) produced may be single-ended, while in other embodiments they may be differential. The read-out circuitry may include any suitable components for performing such read-out functions, as well as circuitry for signal processing functions such as filtering, amplifying, and demodulating. The read-out circuitry may comprise a trans-impedance amplifier in some embodiments. The read-out circuitry may be an application specific integrated circuit (ASIC) in some embodiments, and may be formed on a different substrate from the angular accelerometer, or on the same substrate in some embodiments.

In the system of FIG. 5, the read-out circuitry 504 is connected to I/O interface 506, which may serve as a communication interface through which the system 500 communicates with an external device, such as a remote computer or server. Thus, the I/O interface 506 may transmit the acceleration sensed by accelerometer 502 outside system 500 for further processing and/or display. Additionally or alternatively, the I/O interface 506 may receive communications from an external device such as control signals, wireless charging signals, or software updates.

The I/O interface 506 may be wired or wireless. Suitable wired connections include Universal Serial Bus (USB) and Firewire connections, among others. In those embodiments in which a wired connection is used, the connection may be pluggable. Wired connections may be used in settings in which the system 500 is relatively immobile, for example when fixed on a substantially stationary object, or when the distance between system 500 and an external device with which it communicates remains relatively constant. In some embodiments, however, the I/O interface may be wireless, for example communicating via a flexible radio frequency (RF) antenna.

Power unit 550 may provide power to some or all the components of the system 500, and may take various forms. In some embodiments, power unit 550 may comprise one or more batteries. Accelerometers of the types described herein may, in at least some embodiments, consume sufficiently little power to allow for their operation for extended periods based solely on battery power. The batteries may be rechargeable in some embodiments. Power unit 550 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery.

In some embodiments, power unit 550 may comprise circuitry to convert AC power to DC power. For example, power unit 550 may receive AC power from a power source external to system 500, such as via I/O interface 506, and may provide DC power to some or all the components of system 500. In such instances, power unit 550 may comprise a rectifier, a voltage regulator, a DC-DC converter, or any other suitable apparatus for power conversion.

Power unit 550 may include energy harvesting components and/or energy storage components, in some embodiments. Energy may be harvested from the surrounding environment and stored for powering the system 500 when needed, which may include periodic, random, or continuous powering. The type of energy harvesting components implemented may be selected based on the anticipated environment of the system 500, for example based on the expected magnitude and frequency of motion the system 500 is likely to experience, the amount of stress the system is likely to experience, the amount of light exposure the system is likely to experience, and/or the temperature(s) to which the system is likely to be exposed, among other possible considerations.

Figure 6:
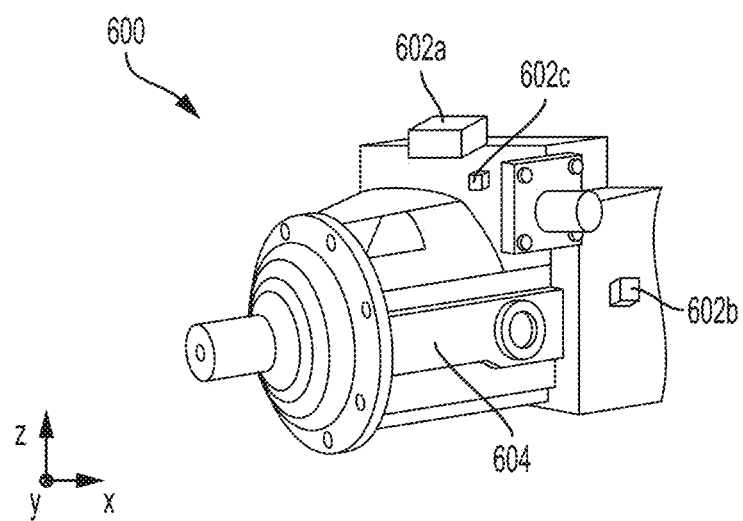
FIG. 6 illustrates a piece of industrial equipment on which are disposed three z-axis accelerometers of the types described herein, according to a non-limiting embodiment of the present application.

Z-axis accelerometers of the types described herein may be used in various applications. As a non-limiting example, the z-axis MEMS accelerometers described herein may be used in machine health monitoring applications. As has been described, z-axis MEMS accelerometers may be particularly beneficial in high operational frequency scenarios, as they may provide increased sensitivity useful in such scenarios. Various industrial machinery may operate at high frequency, for example experiencing high frequency vibration. According to an embodiment of the present application, a z-axis MEMS accelerometer with non-uniform electrode gap distances is coupled to a piece of industrial equipment to monitor vibration of the equipment. FIG. 6 illustrates a non-limiting example.

FIG. 6 illustrates a system 600 including three z-axis MEMS accelerometers 602a, 602b, and 602c of one or more of the types described herein coupled to a piece of industrial equipment 604. The equipment 604 may be a motor, although this is a non-limiting example. The accelerometers 602a-602c may be coupled to the equipment and configured to monitor vibration of the equipment with respect to a respective axis. For example, accelerometer 602a may be oriented to detect z-axis acceleration, accelerometer 602b y-axis acceleration, and accelerometer 602c x-axis acceleration. In an alternative embodiment, two or more of the accelerometers 602a-602c may be combined into a single package or housing, as opposed to the illustrated configuration of three distinct housings. In one embodiment, a system of the type shown in FIG. 5 may be coupled to the equipment 604, with the accelerometers 602a-602c being a part of the system or part of respective systems of the type shown in FIG. 5. The system(s) may wirelessly communicate acceleration data generated by the respective accelerometer. Energy to power the accelerometer circuitry (e.g., readout circuitry 504) may be harvested from the vibration of the equipment 604. Other configurations are possible.

Various aspects of the present application provide various benefits. Some such benefits have been described already, and some such benefits are now listed. It should be appreciated that not all embodiments necessarily exhibit all the listed benefits, and benefits other than those listed may be realized by one or more embodiments of the present application.

Aspects of the present application provide high sensitivity z-axis MEMS accelerometers capable of operating at high frequencies. The z-axis MEMS accelerometers may provide high sensitivity compared to alternative z-axis accelerometers, while maintaining a low occurrence of stiction. The z-axis accelerometer may also provide robust operation suitable for harsh conditions, such as in machine health monitoring scenarios. Other benefits are possible.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A z-axis microelectromechanical systems (MEMS) accelerometer having non-uniform electrode distances, comprising:
   a substrate;
   a pivotable beam coupled to the substrate by an anchor and configured to pivot about the anchor;
   a conductive layer disposed on the substrate;
   a substantially continuous signal electrode disposed on the substrate above the conductive layer and separated from the pivotable beam by a first gap having a first distance; and
   a reference electrode disposed on the substrate, separated from the pivotable beam by a second gap having a second distance greater than the first distance.

2. The z-axis MEMS accelerometer of claim 1, wherein the substantially continuous signal electrode is disposed closer to the anchor than the reference electrode.

3. The z-axis MEMS accelerometer of claim 1, wherein the conductive layer and the substantially continuous signal electrode comprise polysilicon.

4. The z-axis MEMS accelerometer of claim 1, wherein the reference electrode is not disposed above the conductive layer.

5. The z-axis MEMS accelerometer of claim 1, wherein the pivotable beam has a non-planar surface facing the substantially continuous signal electrode.

6. The z-axis MEMS accelerometer of claim 5, wherein the non-planar surface comprises a plurality of bumps occupying greater than 30% of an area of the pivotable beam overlying the substantially continuous signal electrode.

7. The z-axis MEMS accelerometer of claim 1, wherein the substantially continuous signal electrode is a first signal electrode disposed on a first side of the anchor, and wherein the z-axis MEMS accelerometer further comprises a substantially continuous second signal electrode disposed on the substrate above the conductive layer, with the anchor being between the first and second signal electrodes.

8. The z-axis MEMS accelerometer of claim 1, wherein the reference electrode underlies a periphery of the pivotable beam and the substantially continuous signal electrode underlies a central region of the pivotable beam.

9. A z-axis microelectromechanical systems (MEMS) accelerometer having multiple electrode distances, comprising:
   a silicon substrate having an upper surface;
   a pivotable beam suspended above the upper surface of the silicon substrate;
   a reference electrode positioned a first distance from the upper surface of the silicon substrate and separated from the pivotable beam by a first gap having a first gap distance; and
   a substantially continuous signal electrode positioned a second distance greater than the first distance from the upper surface of the silicon substrate and separated from the pivotable beam by a second gap having a second gap distance less than the first gap distance.

10. The z-axis MEMS accelerometer of claim 9, wherein the substantially continuous signal electrode is disposed closer to a pivot point of the pivotable beam than the reference electrode.

11. The z-axis MEMS accelerometer of claim 9, further comprising a standoff layer between the upper surface of the silicon substrate and the substantially continuous signal electrode.

12. The z-axis MEMS accelerometer of claim 11, wherein the standoff layer is a conductive layer.

13. The z-axis MEMS accelerometer of claim 12, wherein the reference electrode is not disposed above the conductive layer.

14. The z-axis MEMS accelerometer of claim 9, wherein the pivotable beam has a non-planar surface facing the substantially continuous signal electrode.

15. The z-axis MEMS accelerometer of claim 14, wherein the non-planar surface comprises a plurality of bumps occupying greater than 30% of an area of the pivotable beam overlying the substantially continuous signal electrode.

16. The z-axis MEMS accelerometer of claim 9, wherein the reference electrode underlies a periphery of the pivotable beam and the substantially continuous signal electrode underlies a central region of the pivotable beam.

17. A z-axis microelectromechanical systems (MEMS) accelerometer, comprising:
   a silicon substrate having an upper surface;
   a pivotable beam suspended above the upper surface of the silicon substrate and configured to pivot about an axis of rotation; and
   a reference electrode and a substantially continuous signal electrode, the substantially continuous signal electrode being positioned vertically closer to the pivotable beam than the reference electrode and being positioned closer to the axis of rotation than the reference electrode.

18. The z-axis MEMS accelerometer of claim 17, wherein the reference electrode is configured to confine charge in the pivotable beam.

19. The z-axis MEMS accelerometer of claim 17, wherein the pivotable beam has a non-planar surface facing the substantially continuous signal electrode.

20. The z-axis MEMS accelerometer of claim 17, further comprising means disposed on the pivotable beam for providing increased sensitivity of the z-axis MEMS accelerometer.

* * * * *